G. A. MINETTY.
DUMPING CAR.
APPLICATION FILED APR. 25, 1911.
1,013,801.
Patented Jan. 2, 1912.
4 SHEETS—SHEET 1.
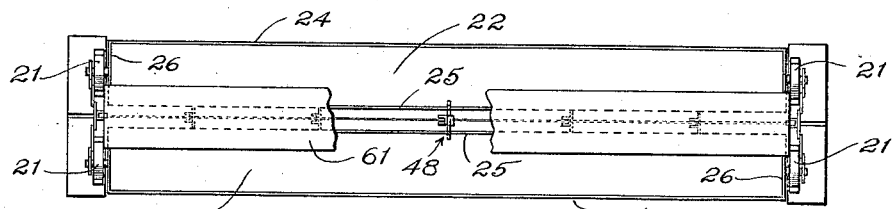
Fig. 1.
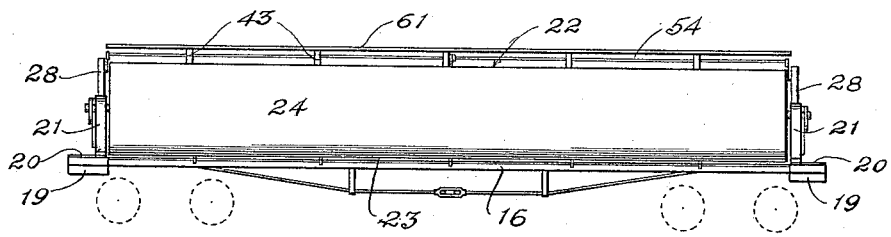
Fig. 2.
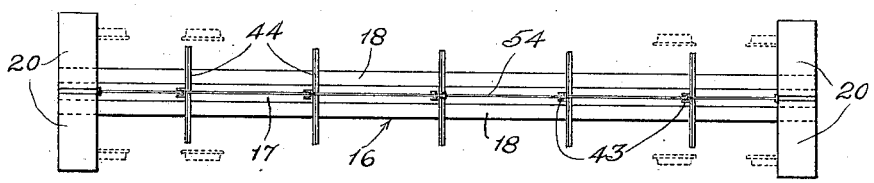
Fig. 3.
Witnesses:
Inventor:
George A. Minetty
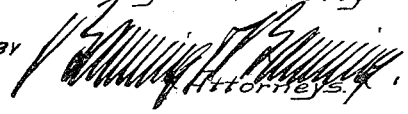
Attorneys.

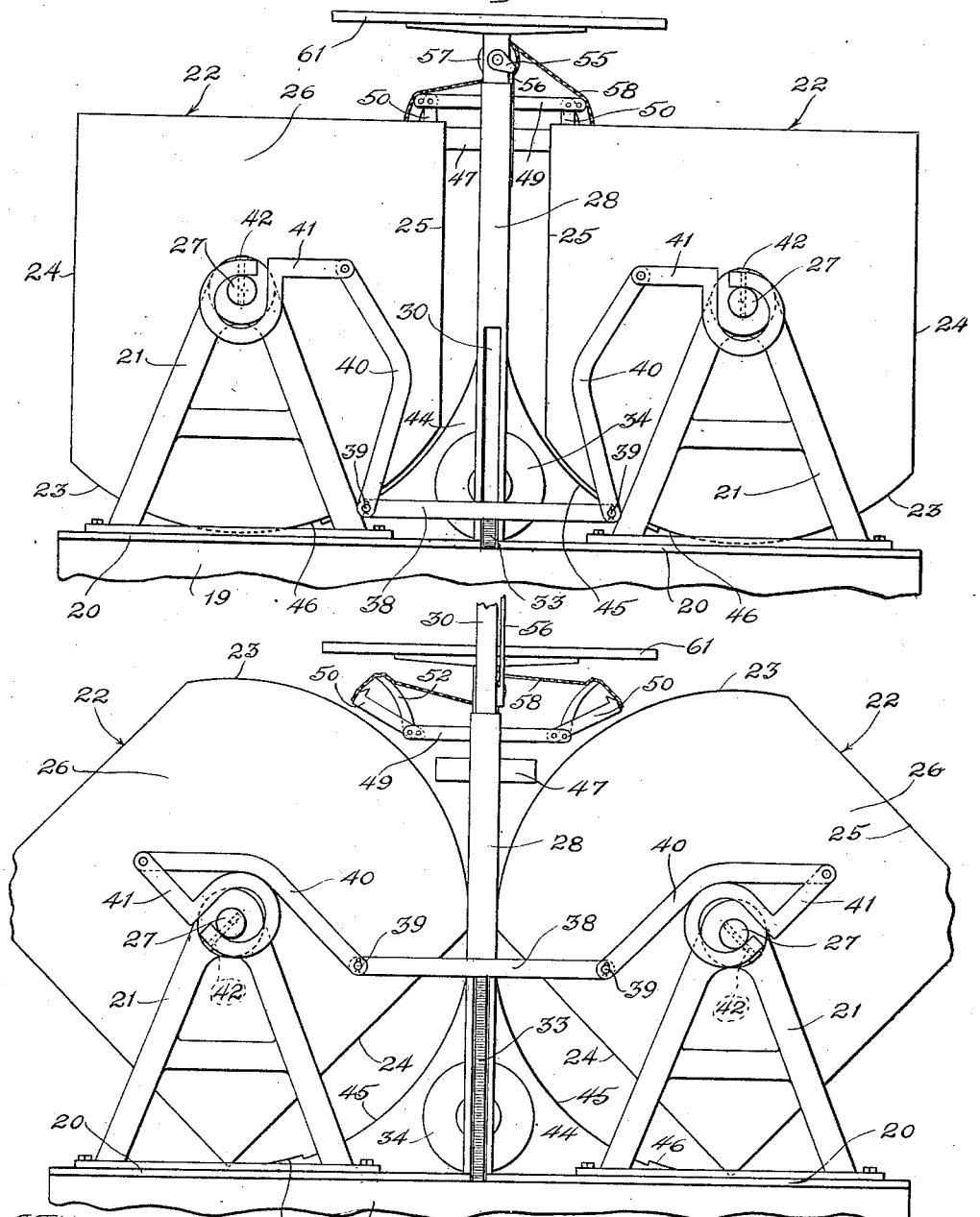

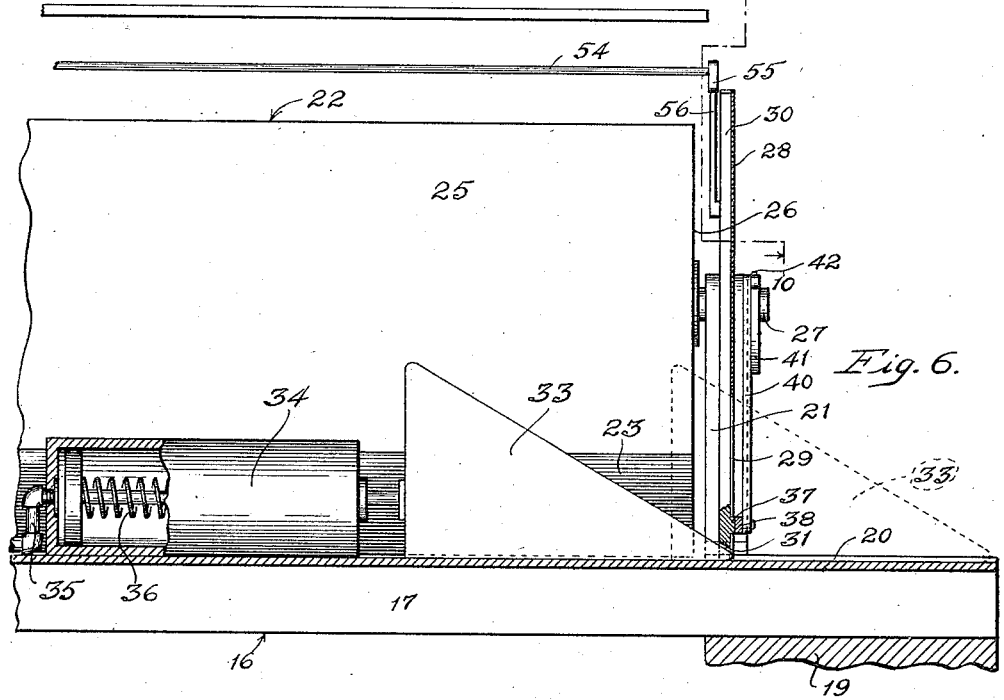
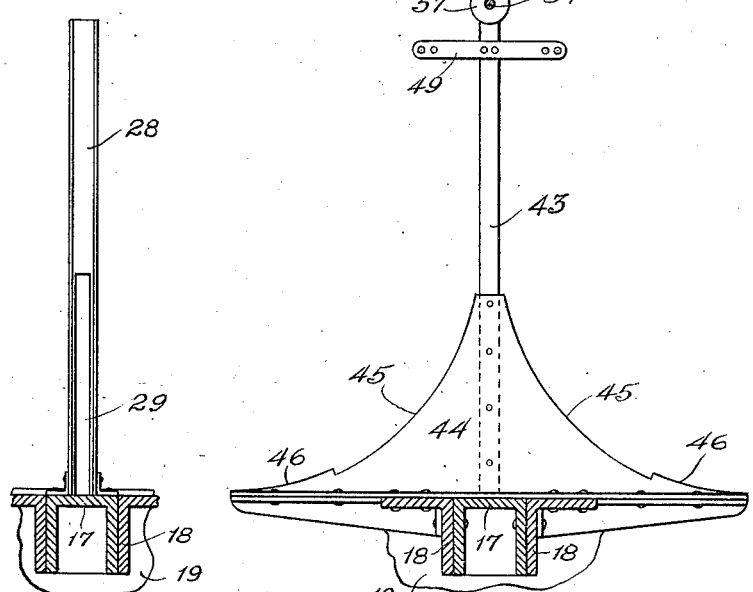
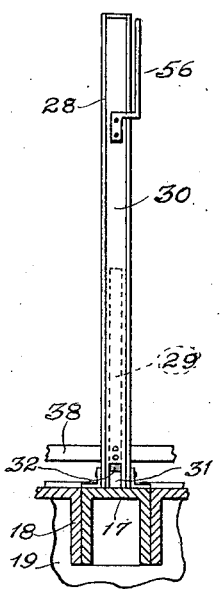

G. A. MINETTY.
DUMPING CAR.
APPLICATION FILED APR. 25, 1911.

1,013,801.

Patented Jan. 2, 1912.

4 SHEETS—SHEET 4.

Witnesses:
Ephraim Banning
Thomas A. Banning jr.

Inventor:
George A. Minetty.
BY Banning & Banning
Attorneys.

UNITED STATES PATENT OFFICE.

GEORGE ALEXANDER MINETTY, OF DAVENPORT, IOWA.

DUMPING-CAR.

1,013,801.   Specification of Letters Patent.   Patented Jan. 2, 1912.

Application filed April 25, 1911. Serial No. 623,204.

*To all whom it may concern:*

Be it known that I, GEORGE ALEXANDER MINETTY, a citizen of the United States, residing at Davenport, in the county of Scott and State of Iowa, have invented certain new and useful Improvements in Dumping-Cars, of which the following is a specification.

This invention relates to cars adapted to be used on steam and electrical railroads for construction or mining work, or in any other similar capacity where materials such as gravel, coal, stone, sand, cement, etc., are transported thereon and unloaded at points of destination.

The principal objects of the present invention are to construct a dumping car which will be simple and cheap to manufacture and be devoid of complicated parts liable to get out of order; to design a car frame adapted to support dumping hoppers which shall be constructed of the least material and possessing the greatest strength; to arrange on said car frame dumping hoppers designed to utilize the maximum available space thereon; to design said hoppers so that they may be operated singly or together to discharge their contents completely and at a safe distance from the track; to mount said hoppers on the car frame in such a manner that they are nearly balanced in their bearings, thereby requiring the application of only a moderate force to turn them to discharging position; to provide safety locking means in connection with said hoppers which shall serve to prevent any discharging movement thereof, except when said hoppers are actuated in the manner intended; to arrange said locking means so that they operate automatically in conjunction with the dumping mechanism to lock or unlock the hoppers as said hoppers are moved to or from normal position; to provide means of control located preferably in the engine of a train of such cars which will operate to dump any or all of the carrying hoppers on said cars; to provide means on said cars adapted to prevent material from dropping between the hoppers thereon when the cars are in process of being loaded, which means may also be utilized as a walking board for the crew of a train of such cars.

The invention further consists in the features of construction and combination of parts hereinafter described and claimed.

Figure 10:
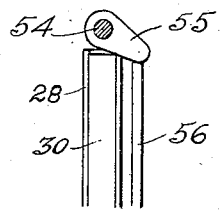
Figure 13:
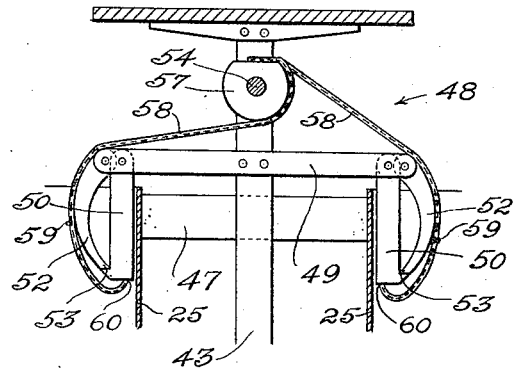
Figure 14:
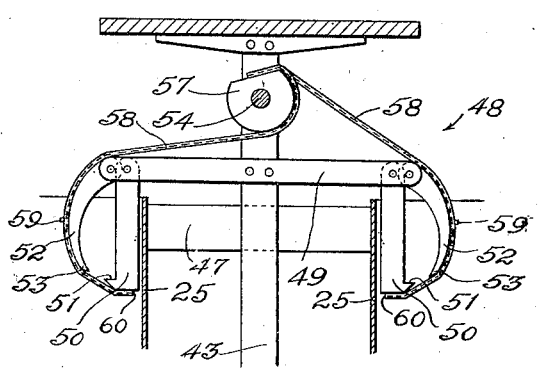
Figure 11:
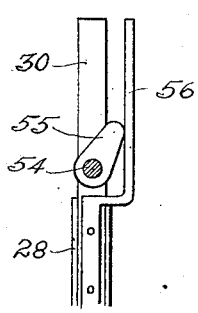
Figure 12:
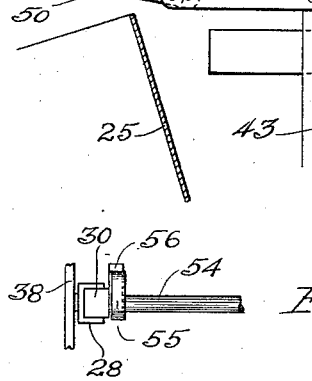

Referring to the drawings, Figure 1 is a plan view of a dumping car of the present invention with a portion of the walking board thereon broken away; Fig. 2 is a side elevation of said car; Fig. 3, a plan view of the supporting frame of said car; Fig. 4, an end view of the car; Fig. 5, a view similar to Fig. 4 showing hoppers in dumping position; Fig. 6 a longitudinal section through one end of the car showing the dumping mechanism; Fig. 7, a cross-section through the car frame showing one of the supporting braces upon which the hoppers bear; Fig. 8 is a detail looking toward the end of the car of a guide post in which a sliding bar constituting a part of the dumping mechanism is positioned; Fig. 9, a view similar to Fig. 8 of said guide post with the said sliding bar in normal position; Fig. 10 is a section taken on line 10—10 of Fig. 6; Fig. 11, a view similar to Fig. 10 showing the position assumed by said sliding bar when in actuated position; Fig. 12, a plan view of the parts as shown in Fig. 11; Fig. 13, a view in normal position of the safety locking means used to prevent dumping of the hoppers, except when actuated in the manner intended; Fig. 14 is a view of said locking means as they appear when first actuated; and Fig. 15, a view of said locking means as they appear fully unlocked.

The present invention relates to a form of dumping car on which is mounted twin carrying hoppers adapted to be rotated outwardly to discharge their contents. It is intended that the mechanism employed to rotate said hoppers shall be operated by air pressure and that between every such dumping car and the locomotive, constituting a train, there shall be an air connection, the necessary pressure of air being furnished by said locomotive and the controlling means for said air being within reach of the engineer thereof. The dumping operation of all the cars in such a train is accordingly entirely controlled by the engineer through the medium of air pressure communicated from the engine through suitable connections into air cylinders on every car which operate to move the carrying hoppers into discharging position.

My invention comprises a car frame 16 composed of a longitudinally extending channel beam 17 positioned between angle beams 18. Secured to the ends of the frame 16 are suitable cross beams 19, upon which may be mounted flooring plates 20 which serve as platforms for said car. To the said frame there is further secured at either end brackets 21, which, as shown, are intended to serve as bearings in which carrying hoppers 22 may be mounted. The said hoppers are each formed with a rounded bottom 23, outer and inner vertical sides 24 and 25, and reinforced ends 26, to each of which is secured a stem or trunnion 27 serving as a bearing for said hopper and which is adapted to rest within the bracket 21. The position of the bearings on each of said hoppers, as best indicated in Fig. 4, is slightly above and outside of the center of gravity thereof, in order that there may be at all times a tendency for said hoppers to remain in upright normal position. The exact position at which the said bearings should preferably be located is to be determined largely by the size and structure of the hoppers; it is not intended, however, that it should be farther away from the center of gravity than is necessary to insure that said hoppers shall remain in normal position.

Positioned at both ends of the car and adjacent the ends of the carrying hoppers is an upright guiding post 28 formed, as best shown in Figs. 4 and 8, with a vertically extending slot 29, the said post being adapted to guide therein in its vertical movement a sliding bar 30. A slot 31 is formed in the lower end of said sliding bar, the upper face 32 of which is adapted to be engaged by a wedge block 33 when advanced. Mechanism 34 suitably located between the hoppers and adjacent the frame of the car is connected by suitable piping 35 with a source of air pressure, not shown in the drawings, the controlling means of which is intended to be in an engine coupled with said car. The said mechanism is adapted when actuated by air pressure to advance the wedge block 33 against tension mechanism 36 to the position indicated by the dotted lines in Fig. 6, in which position it has, of course, considerably elevated the sliding bar 30. The said sliding bar is further formed with a lug member 37 adapted to extend through the slot 29, and to said member there is fixedly secured a horizontal arm 38 as best indicated in Figs. 4 and 5. Removable pins 39 are utilized to establish a pivotal connection at either end of said horizontal arm with angle arms 40, which, in turn, are pivotally connected to hook like arms 41 which are fixedly secured as by means of pins 42 to the trunnions or stems 27. The arrangement of the arms and levers just described with respect to the sliding bar is such that an advance of the wedge block against the underface 32 of said bar will cause the above mentioned parts to be moved to the positions shown in Fig. 5, which movements also cause the hoppers 22 to be rotated to complete discharging position.

Upon the car frame 16 at desired intervals there are positioned a plurality of upright channel iron posts 43, to each of which and to the said car frame are secured brace members 44. The said members are formed with arcuate shaped faces 45 which conform to the shape of the bottoms 23 of the hoppers. As best indicated in Figs. 4 and 5, the said faces do not engage with or bear against the hopper bottoms, except along limited raised portions 46 thereof, which portions it is intended shall extend along the bottoms of the hoppers at least as far as a point directly below the bearings thereof, and coöperate with the brackets 21 to sustain the weight of said hoppers.

Figure 15:
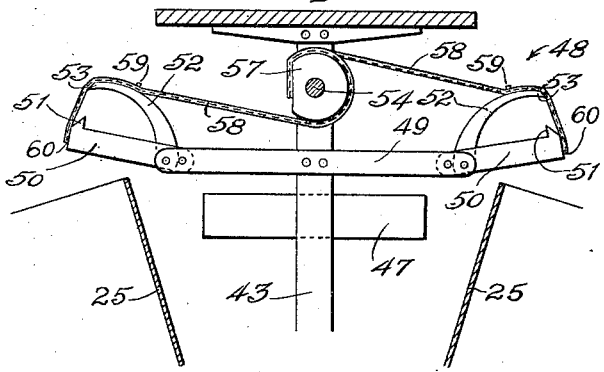

Because of the positions of the bearings 27, the hoppers 22 tend always, by gravity, to swing inwardly and, accordingly, there are provided stop members 47, which, as indicated in Figs. 13, 14, and 15, are secured to the upright posts 43 and serve to maintain the said hoppers in upright position. In order to prevent any possible outward swinging of said hoppers, I have provided a safety lock 48 which operates to prevent dumping movement unless the dumping mechanism is properly actuated. The said lock comprises a horizontally extending arm 49, near each end of which there is pivoted a downwardly depending locking arm 50 provided at its lower end with a shoulder 51, the said locking arm normally tending to lie adjacent the inner side of the side walls 25 of the hoppers. Outward swinging movement of either of said locking arms is prevented by means of bow-shaped dogs 52 pivoted at the outer ends of the horizontal arm 49, the outwardly extending bow portion of said dogs tending to swing their lower acting ends 53 against the shoulders 51 of the locking arms 50. The release of the safety lock just described is accomplished by means of mechanism directly connected with the dumping mechanism and can be operated only with the actuation of said dumping mechanism. A shaft 54 substantially the length of the car extends through the posts 43 and is provided at either end thereof with a cam member 55 adapted to be engaged by fingers 56 secured to the sliding bars 30. The said shaft is also provided with a drum 57 located adjacent the safety lock 48 over which chains 58 are adapted to be wound. The said chains are connected to the dogs 52 as at 59 and with the locking arms 50 as at 60, there being a length of chain between the said points of connection sufficient to permit the links thereof to hang loosely therebetween. When the fingers 56 engage with the cam members 55 to move the latter toward the position indicated in Fig. 11, the shaft 54 is rotated and a portion of the chains 58 wound upon the drum. As soon as said chains commence to wind, the dogs 52 are outwardly drawn from their engagement with the shoulders 51 on the locking arms, the said arms being then free to swing outwardly and the loosely hanging portion of chain being drawn taut, as indicated in Fig. 14. When the shaft 54 is rotated to the extent determined by the finger and cam member as shown in Fig. 11, the drum 57 has wound thereover sufficient length of chains to raise the dogs and locking arms to the position indicated in Fig. 15, in which position the sides 25 of the hoppers are enabled to freely swing outward.

There is further provided along the length of the car of the present invention, separated by the channel iron posts 43, a guard or shield member 61 designed to cover the space between the hoppers. The width of this shield member should permit its edges to extend to a point above the hopper itself. It is intended that the said shield member should serve when the car is in process of being loaded to prevent material from dropping between the hoppers; it is also designed to be used as a walking board over the car for a train crew. Although in the drawings there is represented only a flat smooth shield member it may be preferable to construct the same with downwardly sloping edges to deflect into the hoppers any material which might lodge thereon, and to form along the upper surface serrations or slight projections in order that a sure footing may be had.

The dumping operation of the hoppers is as follows: When air pressure is released from the engine, the mechanisms 34 are actuated and the wedge blocks advanced against the under face of the sliding bar to raise the same. With the commencement of upward movement of said bar the finger 56 rotates the cam member 55, thereby unlocking the safety lock to permit of outward rotation of the hoppers. The amount of movement of the sliding bar necessary to release the safety lock need be only very slight. The sliding bar as it is elevated also raises the horizontal arm 38, which through the medium of the arms 40 and 41, the latter of which are secured to the trunnions 27, operate to rotate the hoppers outwardly. It is evident that when the said hoppers have turned nearly 90 degrees the loose material contained therein will commence to dump over the edge of the side 24, and this shifting of the material will facilitate the continued rotation of said hoppers. The position to which the hoppers may rotate to discharge their contents may be determined by the length of the slot 29 which can be designed to limit the advance of the wedge block 33; or it may be determined by the structure of the angle arms 40 which can be so formed as to bear against the trunnions 27 when the hoppers have rotated a desired amount. As soon as the hoppers have discharged their contents and there is no longer any load bearing upon the sides 24, there will be a tendency, owing to the off-center position of the bearings, for the said hoppers to rotate back again to their normal position. This movement can be perfectly controlled from the engine connected with the car of the present invention by exhausting the air pressure which has heretofore operated to maintain the wedge blocks in advanced position. When the air pressure is released, the tension mechanisms operate to return the wedge blocks to their normal positions; this return movement then permits the hoppers to swing inwardly and return the arms 38, 40, and 41 to their normal positions, and when this return movement is almost completed the fingers 56 slipping by the cam members 55 will then allow the locking arms 50 to descend by gravity, and the dogs to engage against the shoulders thereon.

The advantages gained in the ready dumping of the car of my invention through the medium of air pressure supplied from the engine need not be lost when such a car is side-tracked into a switch-yard. Suitable piping connections may be easily arranged so that whenever it is desired to unload, it is only necessary to connect said piping with the car or with any number of such cars that are coupled, to effect the discharge of their contents. In this way it is not necessary to resort to unloading by hand or summon a locomotive to supply the needed air pressure.

It may often be desired that a car shall discharge only half of its load or its load on only one side. This I have provided for by arranging removable pins 39 which form the pivotal connection between the arms 38 and 40. In case it is wanted to discharge only the hopper on the left side of a car, the pins 39 connecting with the arms on the right side of the car may be removed, so that when the arms 38 are raised only the hopper and mechanism on the left side is actuated.

In the dumping car of the present invention it is to be noted that, except for the outward rotation of the hoppers and the return of the wedge block by tension mechanism, every return movement of all the actuating parts is accomplished automatically by the action of gravity. There is hence no complication of parts made necessary, which on an open car, subjected to heavy use, is an important consideration. It is possible in a car constructed with only a relatively narrow longitudinally extending center sill to mount thereon hoppers which may be oscillated through a turn of at least 135°, as indicated in the drawings; or more if it is desired. Furthermore, it is possible on such a car frame to so design the hoppers that the edges over which the materials are dumped when the hoppers are in dumping position shall be outside of the tracks on which the car runs, by several feet, thus causing the materials so discharged to fall upon the ground at a safe and considerable distance from the track.

The car illustrated in the drawings is intended to represent one of large carrying capacity. Where the dumping car of my invention is used for lighter work, fewer parts may be required in its construction. For instance, it may not be necessary or desirable to have dumping mechanism located at both ends of the car but simply at one end thereof, this being sufficient for smaller cars. Likewise, the number of arcuate shaped braces may be reduced where a lighter load is to be sustained. It is also to be understood that I do not limit my invention to the use of the mechanical means illustrated and described, since, obviously, other equivalent means may well be used in the operation of the dumping car of the present invention. The dumping mechanisms of the present invention may also be successfully operated by elastic mediums under pressure other than air, as, for instance, steam, and accordingly I do not desire to be limited in my invention to air pressure means for dumping the hoppers.

I claim:

1. In a dumping car of the class described, the combination of a plurality of oscillatable hoppers adapted normally to remain in upright position, and actuating mechanism therefor, comprising piston mechanism operated by a medium under pressure and located intermediate said hoppers, a slidable support operatively connected with said piston and adapted to be raised thereby, and connecting arms extending from said slidable support to each of said hoppers to oscillate the same simultaneously, said arms being symmetrically arranged and oppositely disposed with respect to the said slidable support, whereby the oscillating forces are equalized, substantially as described.

2. In a dumping car of the class described, the combination of a plurality of oscillatable hoppers adapted normally to remain in upright position, and actuating mechanism therefor, comprising piston mechanism operated by a medium under pressure and located intermediate said hoppers, a slidable support operatively connected with said piston mechanism and adapted to be raised thereby, and connecting arms extending from said slidable support to each of said hoppers to oscillate the same simultaneously, said arms being symmetrically arranged and oppositely disposed with respect to the said slidable support whereby the oscillating forces are equalized, and locking means operated in conjunction with the actuating mechanism for normally preventing movement of said hoppers, substantially as described.

3. In a dumping car of the class described, the combination of a plurality of oscillatable hoppers adapted normally to remain in upright position, and actuating mechanism therefor, comprising piston mechanism operated by a medium under pressure and located intermediate said hoppers, a slidable support operatively connected with said piston mechanism and adapted to be raised thereby, and connecting arms extending from said slidable support to each of said hoppers to oscillate the same simultaneously, said arms being symmetrically arranged and oppositely disposed with respect to the said slidable support whereby the oscillating forces are equalized, and locking means operated in conjunction with the actuating mechanism for normally preventing movement of said hoppers, said locking means comprising a pivotally swinging locking arm adapted normally to prevent oscillation of said hoppers, a shoulder adjacent the swinging end of said arm, a bow-shaped dog pivoted at a point substantially above said shoulder and adapted to bear its acting end thereagainst, a chain secured to said dog and said arm and hanging loosely therebetween, and means operated in conjunction with the said actuating mechanism for retracting said chain a determined distance whereby the acting end of said dog is disengaged from said shoulder to permit upward swinging of said locking arm, substantially as described.

4. In a dumping car of the class described, the combination of a plurality of oscillatable hoppers adapted normally to remain in upright position, and actuating mechanism therefor, comprising piston mechanism operated by a medium under pressure and located intermediate said hoppers, a slidable support operatively connected with said piston mechanism and adapted to be raised thereby, and connecting arms extending from said slidable support to each of said hoppers to oscillate the same simultaneously, said arms being symmetrically arranged and oppositely disposed with respect to the said slidable support whereby the oscillating forces are equalized, and locking means operated in conjunction with the actuating mechanism for normally preventing movement of said hoppers, said locking means comprising a locking arm adapted to engage and prevent oscillation of said hoppers, and a gravity actuated member adapted to bear against said locking arm and prevent displacement of the same, and means operated in conjunction with the said hopper actuated mechanism for retracting said gravity actuated member whereby the locking arm may be released, substantially as described.

5. In a dumping car of the class described, a pair of oscillatable hoppers adapted normally to remain in upright position, piston mechanism for operating the same located intermediate said hoppers, and actuating arms connected therewith symmetrically arranged and oppositely disposed with respect to said mechanism, whereby the oscillating forces are equalized, in combination with locking means operated in conjunction with said piston mechanism for normally preventing movement of said hoppers, substantially as described.

6. In a dumping car of the class described, the combination of a pair of oscillatable hoppers adapted normally to remain in upright position, piston mechanism for operating the same located intermediate said hoppers, and actuating arms connected therewith symmetrically arranged and oppositely disposed with respect to said mechanism, whereby the oscillating forces are equalized, substantially as described.

7. In a dumping car of the class described, the combination of a pair of oscillatable hoppers adapted normally to remain in upright position, piston mechanism for operating the same located intermediate said hoppers, and actuating arms removably connected therewith in a manner whereby any selected hoppers may be oscillated, substantially as described.

GEORGE ALEXANDER MINETTY.

Witnesses:
JOHN D. LONESGAN,
JOSEPH CORSIGLIA.

---

Copies of this patent may be obtained for five cents each, by addressing the "Commissioner of Patents, Washington, D. C."